United States Patent [19]

Brownstein

[11] Patent Number: 4,485,406
[45] Date of Patent: Nov. 27, 1984

[54] FILM VIDEO PLAYER WITH ZOOM AND SCAN

[75] Inventor: Scott A. Brownstein, Rochester, N.Y.

[73] Assignee: Eastman Kodak Company, Rochester, N.Y.

[21] Appl. No.: 427,061

[22] Filed: Sep. 29, 1982

[51] Int. Cl.³ ............................................. H04N 3/26
[52] U.S. Cl. .................................. 358/227; 358/211; 358/54
[58] Field of Search ............... 358/214, 213, 215, 216, 358/227, 54, 56, 209, 211, 212, 474, 475, 217, 218, 289.1, 289.12

[56] References Cited

U.S. PATENT DOCUMENTS

| | | | |
|---|---|---|---|
| 2,415,281 | 2/1947 | Gradisar et al. | 88/24 |
| 2,976,357 | 3/1961 | Hammett | 358/214 |
| 3,953,885 | 4/1976 | Biber | 358/54 |
| 4,087,839 | 5/1978 | Lemelson | 358/214 |
| 4,331,979 | 5/1982 | Benoell | 358/214 |
| 4,381,523 | 4/1983 | Eguchi et al. | 358/227 |
| 4,418,360 | 11/1983 | Glasgow | 358/108 |

OTHER PUBLICATIONS

"Simple Method Uses Peristaltic CCD's to Display Color Slides on TV Set" Electronics, Mar. 1979, p. 70.
"An All-Electronic Camera by Kodak?" Times Union Newspaper, Wed., Oct. 28, 1981.

Primary Examiner—Gene Z. Rubinson
Assistant Examiner—Robert Lev
Attorney, Agent, or Firm—Thomas H. Close

[57] ABSTRACT

A film video player for sensing photographic images having a given resolution to produce a standard video signal having a lower resolution, includes a zoom lens for selectively varying the magnification of the film image with respect to the image sensor and means for selectively translating the film image vertically and horizontally with respect to the image sensor, whereby the available resolution of the film image is more effectively utilized by the film video player.

6 Claims, 1 Drawing Figure

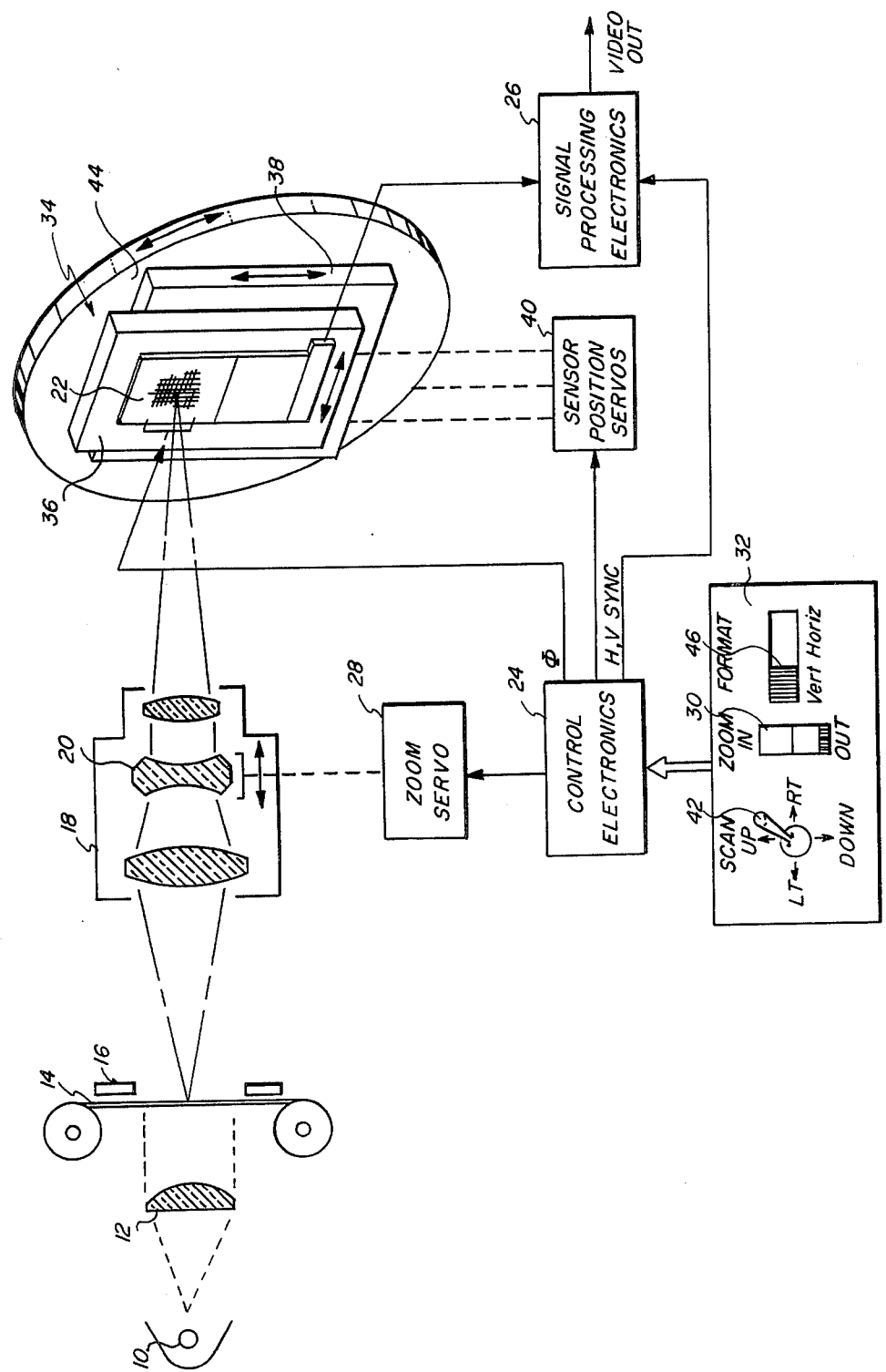

FILM VIDEO PLAYER WITH ZOOM AND SCAN

BACKGROUND OF THE INVENTION

Cross Reference To Related Applications

U.S. application Ser. No. 426,426, "Film Video Player Having Flash Illuminated Area Image Sensor and Single Frame CCD Image Sensor for Use Therewith" by T. H. Lee and L. Moore;

U.S. application Ser. No. 427,077, "Film Video Player with Zoom, Scan, and Automatic Border Control" by W. T. Fearnside;

U.S. application Ser. No. 427,069, "Video Player, Film Medium, and Photographic Printer For Automatic Cropping" by S. Brownstein.

Field of the Invention

The present invention relates to film players for sensing a film image to produce a video signal for display on a standard television.

Description Related to the Problem

The use of a television set as a display medium for amateur snapshots has been proposed. Recently, an all electronic camera system has been demonstrated, wherein a scene is photographed by an electronic still camera, essentially a solid state television camera operated in a single frame mode, and the video signal generated thereby is recorded on a recording medium such as a magnetic disc. The video signal is played back and displayed on a standard television set.

Apparatus for sensing positive or negative photographic color film to produce a television signal is well known. A slide player for home viewing of color slides on television, called the Color Slide Scanner model CSS-1 was sold by the GTE Sylvania Company. This slide player employed a CRT flying spot scanner to sense color slides. More recently, slide players employing solid state image sensing arrays to sense the slides have been proposed. See for example the article entitled "Simple Method Uses Peristaltic CCD's to Display Color Slides on TV Set", Electronics, March, 1979, page 70.

Photographic film possesses a major advantage over the image sensors employed in the all electronic cameras in being able to record an image at a much higher resolution. Standard photographic film formats are capable of resolution from several to many times the resolution of the standard television system. When photographic film is displayed on a standard television this extra available resolution is wasted, since the resolution of the displayed image is inherently limited by the resolution of the television system. The problem I faced was to find a way to make more of the resolution of photographic film available for display in a film video player.

SOLUTION TO THE PROBLEM—SUMMARY OF THE INVENTION

The above noted problems are solved according to my invention by providing a film video player for sensing photographic film images having a given resolution to produce a standard video signal having a lower resolution, with zoom means for selectively varying the magnification of the film image and scan means for selectively translating the film image vertically and horizontally whereby more of the resolution of the film image is available for utilization by the film video player.

According to a further feature of the invention, the video player includes means for rotating the film image with respect to the image sensor by 90° for switching between vertical and horizontal format displays.

According to the preferred embodiment of the invention, the video player includes a solid state area image sensing array for sensing the film image and an X-Y translating stage which carries the image sensor, for translating the image sensor vertically and horizontally with respect to the film image.

BRIEF DESCRIPTION OF THE DRAWING

The invention will be described with reference to the accompanying drawing showing schematically a film video player having zoom and scan according to a preferred embodiment of the present invention.

DESCRIPTION OF THE PREFERRED EMBODIMENT

A film video player having zoom and scan apparatus according to the present invention is shown schematically in the FIGURE. The video player includes a light source 10 and a condensor lens 12 for illuminating an information bearing medium such as a photographic color negative film 14 in a film gate 16. An image of the illuminated film in the gate is formed by a zoom lens 18, having a movable element 20, on a solid state color image sensing array 22. The solid state image sensor, such as a CCD frame transfer image sensor with an integral color filter array, is responsive to light to produce a plurality of color video signals. Such an image sensor is described in U.S. Pat. No. 4,001,878 issued Jan. 4, 1977 to P. K. Weimer. The solid state color image sensor 22 is driven in a known manner by polyphase clock signals Φ generated by control electronics 24. The output of the solid state image sensor 22 along with horizontal and vertical synchronization signals H and V from the control electronics 24 are supplied to signal processing electronics 26 which produce the standard color video signal in a known manner.

According to the preferred embodiment of the present invention, "zoom" is effected by providing the film video player with means for selectively changing the magnification of the image of the film on the image sensor 22. In the preferred embodiment shown in the FIGURE, lens element 20 is movable in lens 18 to change the magnification of the zoom lens. The position of movable lens element 20 and hence the magnification of the zoom lens is controlled by a zoom servo 28 comprising for example, a stepper motor driven by control electronics 24. The position of zoom servo 28 is selected for example, by operating a rocker switch 30 on a hand-held control unit 32. When the rocker switch 30 is actuated in one direction, the image is zoomed "in" or magnified, and when operated in the other direction, the image is zoomed "out" or made smaller.

The zoom lens is preferably chosen to have a range of magnification such that at its lowest magnification the image of the film frame just fills the image sensor, and at its highest magnification, the resolution of the magnified image on the image sensor is substantially equal to the standard television resolution.

According to the present invention, "scan" is effected by providing the video player with an X-Y translation stage generally designated 34 for carrying the image sensor 22. The X-Y translation stage 34 includes a first platform 36 which carries the image sensor 22 and is movable in the horizontal direction, and a second platform 38 which carries the first movable platform 36 and is movable in a vertical direction. The movable platforms 36 and 38 are driven by sensor position servos 40, comprising for example, a pair of stepper motors controlled by control electronics 24. The positions of movable platforms 36 and 38 are selectively controlled by a joystick 42 on hand-held control unit 32. The operator of the video player uses the hand-held control unit 32 to selectively change the magnification of the displayed image on the film and to center the objects of interest in the display, thereby making the full resolution capability of the film available to the video display.

According to a further aspect of the invention, the X-Y translation stage 34 is carried by a rotary stage 44 that can rotate the sensor 90° about the optical axis of the video player to accommodate vertical format pictures in film 14. The orientation of the rotary stage 44 is controlled by a format switch 46 on hand-held control unit 32. Alternatively, optical means such as a rotatable dove prism may be disposed in the optical path of the video player to rotate the image of the film with respect to the sensor 22. This feature is useful when some frames on a film strip 14 have been exposed with a camera held in its normal orientation and some other frames have been exposed with the camera rotated 90° about its optical axis.

The invention has been described with reference to a preferred embodiment, however it is understood that variations and modifications may be made within the spirit and scope of the invention. For example, the scanning displacement of the image of the film with respect to the image sensor can be effected by moving the film, moving the lens, or by moving mirrors interposed in the optical path of the video player. Similarly, the variable magnification can be achieved by a zoom lens which maintains a fixed focal plane, or by moving a lens and the image sensor simultaneously to change magnification and maintain focus.

Furthermore, in a flying spot scanner type video player "zoom" and "scan" may be effected by changing the size and position of the scanning raster with respect to the film image. "Zoom" and "scan" may also be effected electronically by providing an image sensor capable of resolution greater than standard television resolution, and employing only a portion of the signal generated by the sensor as the video signal.

I claim:

1. In a film video player for sensing photographic images having a given resolution to produce a standard video signal having a lower resolution, the improvement comprising
    (a) zoom means for selectively varying the magnification of said film image;
    (b) scan means for selectively translating said film image vertically and horizontally whereby the resolution of the film image is available to be utilized by said video player; and
    (c) means for selectively rotating said film image with respect to said video frames.

2. The invention claimed in claim 1, wherein said zoom means has a range of magnification between a lower magnification wherein the film frame image just substantially fills the video frame and a higher magnification wherein the resolution of the magnified film image is substantially equal to the standard television resolution.

3. The invention claimed in claim 1, wherein said video player includes a solid state imaging sensing array, wherein said zoom means comprises a movable zoom lens element, and wherein said scan means comprises means for displacing said solid state image sensing array vertically and horizontally with respect to said zoom lens.

4. The invention claimed in claim 1, wherein said video player includes a solid state image sensing array, said zoom means comprises a zoom lens and a servo motor coupled to said zoom lens, and said means for translating said image comprises an X-Y translation stage and a pair of servo motors coupled to said translation stage, said solid state image sensing array being carried by said X-Y translation stage.

5. The invention claimed in claim 1, further comprising a hand-held control unit, including operator controls for said zoom and scan means.

6. The invention claimed in claim 4, wherein said image rotating means comprises a rotating stage and a servo motor connected to said rotating stage, said X-Y translating stage being carried by said rotating stage.

* * * * *